(12) United States Patent
Laberteaux (10) Patent No.: US 7,450,713 B2
(45) Date of Patent: *Nov. 11, 2008

(54) ECHO CANCELLER EMPLOYING DUAL-H ARCHITECTURE HAVING IMPROVED NON-LINEAR ECHO PATH DETECTION

(75) Inventor: Kenneth P. Laberteaux, South Bend, IN (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/361,802

(22) Filed: Feb. 23, 2006

(65) Prior Publication Data

US 2006/0140393 A1    Jun. 29, 2006

Related U.S. Application Data

(63) Continuation of application No. 10/291,304, filed on Nov. 8, 2002, now Pat. No. 7,031,459, which is a continuation of application No. 09/483,988, filed on Jan. 18, 2000, now Pat. No. 6,507,652, which is a continuation of application No. 08/970,228, filed on Nov. 14, 1997, now Pat. No. 6,028,929.

(51) Int. Cl.
    *H04M 9/08*    (2006.01)
(52) U.S. Cl. .............................. 379/406.01
(58) Field of Classification Search ............. 379/406.01
    See application file for complete search history.

(56) References Cited

U.S. PATENT DOCUMENTS 2,787,645 A    4/1957    Danzker et al.

(Continued)

FOREIGN PATENT DOCUMENTS

| EP | 0422796 A2 | 4/1991 |
| JP | 2-55429 A * | 2/1990 |
| WO | WO 99/26399 | 5/1999 |

OTHER PUBLICATIONS

Beaufays, et al, "An Efficient First-Order Stochastic Algorithm for Lattice Filters," *Proc. ICANN*, pp. 26-29 (1994.).

(Continued)

*Primary Examiner*—Ramnandan Singh
(74) *Attorney, Agent, or Firm*—Hamilton, Brook, Smith & Reynolds, P.C.

(57) ABSTRACT

An echo canceller circuit for use in an echo canceller system is set forth that provides sensitive non-linear echo path response detection. The echo canceller circuit comprises a first digital filter having non-adaptive tap coefficients to simulate an echo response occurring during a call. A second digital filter having adaptive tap coefficients to simulate an echo response occurring during the call is also used. The adaptive tap coefficients of the second digital filter are updated over the duration of the call. A coefficient transfer controller is disposed in the echo canceller circuit to transfer the adaptive tap coefficients of the second digital filter to replace the tap coefficients of the first digital filter when a set of one or more transfer conditions is met. A non-linear echo path response detector is provided. The non-linear echo path detector is responsive to one or more parameters of the first and second digital filters to detect a non-linear echo path condition. In accordance with one embodiment of the present invention, the non-linear echo path detector is responsive to a transfer density value corresponding to a number of transfers executed by the coefficient transfer controller. In accordance with a further embodiment of the present invention, the non-linear echo path detector is responsive to a coefficient time dispersion characteristic of the second digital filter for detecting a non-linear echo path condition.

25 Claims, 9 Drawing Sheets

U.S. PATENT DOCUMENTS

| | | | |
|---|---|---|---|
| 3,647,992 A | 3/1972 | Thomas | |
| 3,780,233 A | 12/1973 | Campanella et al. | |
| 3,787,645 A | 1/1974 | Ochiai et al. | |
| 3,836,734 A | 9/1974 | Campanella et al. | |
| 3,894,200 A | 7/1975 | Campanella et al. | |
| 4,064,378 A | 12/1977 | Kitayama et al. | |
| 4,064,379 A | 12/1977 | Horna | |
| 4,113,997 A | 9/1978 | Horna | |
| 4,144,417 A | 3/1979 | Oshima et al. | |
| 4,321,686 A | 3/1982 | Horna | |
| 4,360,712 A | 11/1982 | Horna | |
| 4,377,793 A | 3/1983 | Horna | |
| 4,389,726 A | 6/1983 | Le Guyader et al. | |
| 4,443,859 A | 4/1984 | Wiggins | |
| 4,554,417 A | 11/1985 | Boyer | |
| 4,574,166 A | 3/1986 | Gritton | |
| 4,577,071 A | 3/1986 | Johnston et al. | |
| 4,578,676 A | 3/1986 | Harrison, Jr. | |
| 4,600,815 A | 7/1986 | Horna | |
| 4,608,464 A | 8/1986 | Morikawa et al. | |
| 4,621,172 A | 11/1986 | Kanemasa et al. | |
| 4,628,156 A | 12/1986 | Irvin | |
| 4,633,046 A | 12/1986 | Kitayama et al. | |
| 4,645,883 A | 2/1987 | Horna et al. | |
| 4,679,230 A | 7/1987 | Lassaux et al. | |
| 4,707,284 A | 11/1987 | Goldblatt et al. | |
| 4,712,235 A | 12/1987 | Jones, Jr. | |
| 4,752,903 A | 6/1988 | Iwata et al. | |
| 4,757,527 A | 7/1988 | Beniston et al. | |
| 4,782,525 A | 11/1988 | Sylvain et al. | |
| 4,792,915 A * | 12/1988 | Adams et al. | 708/322 |
| 4,805,215 A | 2/1989 | Miller | |
| 4,823,382 A | 4/1989 | Martinez | |
| 4,894,820 A | 1/1990 | Miyamoto et al. | |
| 4,918,727 A | 4/1990 | Rohrs et al. | |
| 4,977,591 A * | 12/1990 | Chen et al. | 379/406.1 |
| 4,998,241 A | 3/1991 | Brox et al. | |
| 5,148,427 A * | 9/1992 | Buttle et al. | 370/291 |
| 5,157,653 A | 10/1992 | Genter | |
| 5,189,637 A | 2/1993 | Eriksson | |
| 5,263,020 A | 11/1993 | Yatsuzuka et al. | |
| 5,274,705 A | 12/1993 | Younce et al. | |
| 5,283,784 A | 2/1994 | Genter | |
| 5,307,405 A | 4/1994 | Sih | |
| 5,343,522 A | 8/1994 | Yatrou et al. | |
| 5,463,618 A | 10/1995 | Furukawa et al. | |
| 5,592,548 A | 1/1997 | Sih | |
| 5,631,900 A | 5/1997 | McCaslin et al. | |
| 5,644,635 A | 7/1997 | Armbruster | |
| 5,646,991 A | 7/1997 | Sih | |
| 5,663,955 A | 9/1997 | Iyengar | |
| 5,664,011 A | 9/1997 | Crochiere et al. | |
| 5,668,794 A | 9/1997 | McCaslin et al. | |
| 5,689,556 A | 11/1997 | Gupta et al. | |
| 5,721,772 A | 2/1998 | Haneda et al. | |
| 5,745,564 A | 4/1998 | Meek | |
| 5,774,561 A | 6/1998 | Nakagawa et al. | |
| 5,796,819 A | 8/1998 | Romesburg | |
| 5,812,537 A | 9/1998 | Betts et al. | |
| 5,818,945 A | 10/1998 | Makino et al. | |
| 5,933,494 A | 8/1999 | Yang et al. | |
| 6,028,929 A * | 2/2000 | Laberteaux | 379/406.08 |
| 6,031,908 A | 2/2000 | Laberteaux et al. | |
| 6,064,873 A * | 5/2000 | Eriksson et al. | 455/403 |
| 6,091,813 A | 7/2000 | Harley et al. | |
| 6,125,179 A | 9/2000 | Wu | |
| 6,181,793 B1 | 1/2001 | Laberteaux et al. | |
| 6,185,300 B1 | 2/2001 | Romesburg | |
| 6,195,430 B1 | 2/2001 | Eriksson et al. | |
| 6,198,819 B1 | 3/2001 | Farrell et al. | |
| 6,240,180 B1 | 5/2001 | Younce et al. | |
| 6,266,409 B1 | 7/2001 | Laberteaux et al. | |
| 6,337,907 B1 | 1/2002 | Laberteaux et al. | |
| 6,507,652 B1 * | 1/2003 | Laberteaux | 379/406.05 |
| 6,614,907 B1 | 9/2003 | Laberteaux et al. | |
| 6,718,035 B2 | 4/2004 | Younce et al. | |
| 7,003,095 B2 | 2/2006 | Nakai et al. | |
| 7,020,278 B2 | 3/2006 | Farrell et al. | |
| 7,031,459 B2 * | 4/2006 | Laberteaux | 379/406.05 |
| 7,050,545 B2 | 5/2006 | Tanrikulu et al. | |
| 7,200,222 B2 | 4/2007 | Laberteaux et al. | |

OTHER PUBLICATIONS

Chen, et al, "Cancellation of Noise in an Acoustic Experiment by an Adaptive Lattice Filter," *Mechanical and Aerospace Engineering, University of California, LA*, pp. 1-6.

Yoo, et al., "A New Double Talk Detector Using the Lattice Predictors for an Acoustic Echo Canceller," *Proc. of IEEE*, vol. 2, pp. 483-486 (Dec. 1997).

Haykin, "Adaptive Filter Theory," 3rd Ed., pp. 283-286, *Prentice Hall* (1996).

Maruyama, et al., "FIR/Lattice Type Echo Canceller", Japanese Kokai Patent Application No. Hei 2[1990]-278926.

Haykin, "Adaptive Filter Theory," 4th Ed., pp. 535-543, *Prentice Hall* (2001).

Makhoul, et al., "Adaptive Lattice Analysis of Speech," *IEEE Trans. on Acoustics, Speech, and Signal Processing*, vol. ASSP-29 No. 3 (Jun. 1981).

* cited by examiner

ECHO CANCELLER EMPLOYING DUAL-H ARCHITECTURE HAVING IMPROVED NON-LINEAR ECHO PATH DETECTION

CROSS-REFERENCE TO RELATED APPLICATIONS

The present application is a continuation of and claims priority to non-provisional patent application U.S. Ser. No. 10/291,304, filed on Nov. 8, 2002, now U.S. Pat. No. 7,031,459 which is a continuation of U.S. Ser. No. 09/483,988, filed on Jan. 18, 2000, now U.S. Pat. No. 6,507,652 B1, which is a continuation of U.S. Ser. No. 08/970,228, filed on Nov. 14, 1997, now U.S. Pat. No. 6,028,929. The following applications, filed on Nov. 14, 1997, are incorporated by reference: Ser. No. 08/970,230,"Echo Canceller Employing Dual-H Architecture Having Improved Coefficient Transfer", now U.S. Pat. No. 6,181,793 B1; Ser. No. 08/971,116, "Echo Canceller Employing Dual-H Architecture Having Improved Double-Talk Detection", now U.S. Pat. No. 6,266,409 B1; Ser. No. 08/970,874, "Echo Canceller Employing Dual-H Architecture Having Variable Adaptive Gain Settings", now U.S. Pat. No. 6,031,908; Ser. No. 08/970,639, "Echo Canceller Employing Dual-H Architecture Having Improved Non-Linear Processor", now U.S. Pat. No. 6,198,819 B1; Ser. No. 08/970,229, "Echo Canceller Employing Dual-H Architecture Having Split Adaptive Gain Settings", now U.S. Pat. No. 6,240,180 B1.

STATEMENT REGARDING FEDERALLY SPONSORED RESEARCH OR DEVELOPMENT

Not Applicable

BACKGROUND OF THE INVENTION

Long distance telephone facilities usually comprise four-wire transmission circuits between switching offices in different local exchange areas, and two-wire circuits within each area connecting individual subscribers with the switching office. A call between subscribers in different exchange areas is carried over a two-wire circuit in each of the areas and a four-wire circuit between the areas, with conversion of speech energy between the two and four-wire circuits being effected by hybrid circuits. Ideally, the hybrid circuit input ports perfectly match the impedances of the two and four-wire circuits, and its balanced network impedance perfectly matches the impedance of the two-wire circuit. In this manner, the signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so long as the time delay in the echo path is relatively short, for example, shorter than about 40 milliseconds. However, longer echo delays can be distracting or utterly confusing to a far end speaker, and to reduce the same to a tolerable level an echo canceller may be used toward each end of the path to cancel echo which otherwise would return to the far end speaker. As is known, echo cancellers monitor the signals on the receive channel of a four-wire circuit and generate estimates of the actual echoes expected to return over the transmit channel. The echo estimates are then applied to a subtractor circuit in the transmit channel to remove or at least reduce the actual echo.

In simplest form, generation of an echo estimate comprises obtaining individual samples of the signal on the receive channel, convolving the samples with the impulse response of the system and then subtracting, at the appropriate time, the resulting products or echo estimates from the actual echo on the transmit channel. In actual practice generation of an echo estimate is not nearly so straightforward.

Transmission circuits, except those which are purely resistive, exhibit an impulse response that has amplitude and phase dispersive characteristics that are frequency dependent, since phase shift and amplitude attenuation vary with frequency. To this end, a suitable known technique for generating an echo estimate contemplates manipulating representations of a plurality of samples of signals which cause the echo and samples of impulse responses of the system through a convolution process to obtain an echo estimate which reasonably represents the actual echo expected on the echo path. One such system is illustrated in FIG. 1.

Figure 1:
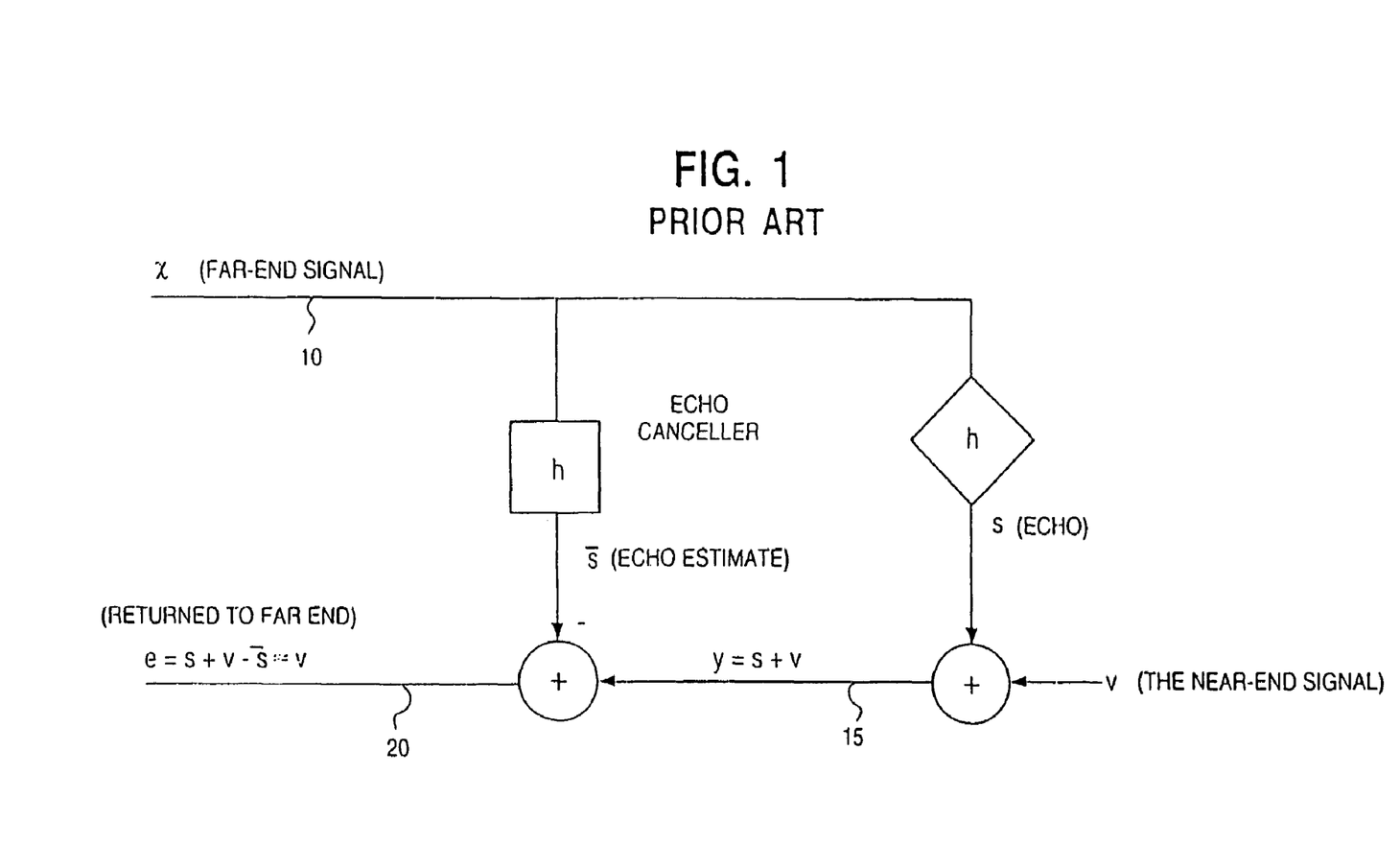
FIG. 1 is a block diagram of a conventional canceller.

In the system illustrated in FIG. 1, a far end signal x from a remote telephone system is received locally at line 10. As a result of the previously noted imperfections in the local system, a portion of the signal x is echoed back to the remote site at line 15 along with the signal v from the local telephone system. The echo response is illustrated here as a signal s corresponding to the following equation:

$$s = x * h$$

where h is the impulse response of the echo characteristics. As such, the signal sent from the near end to the far end, absent echo cancellation, is the signal y, which is the sum of the telephone signal v and the echo signal s. This signal is illustrated as y at line 15 of FIG. 1.

To reduce and/or eliminate the echo signal component s from the signal y, the system of FIG. 1 uses an echo canceller having an impulse response filter $\bar{h}$ that is the estimate of the impulse echo response h. As such, a further signal $\bar{s}$ representing an estimate of echo signal s is generated by the echo canceller in accordance with the following equation:

$$\bar{s} = \bar{h} * x$$

The echo canceller subtracts the echo estimate signal $\bar{s}$ from the signal y to generate a signal e at line 20 that is returned to the far end telephone system. The signal e thus corresponds to the following equation:

$$e = s + v - \bar{s} \approx v$$

As such, the signal returned to the far end station is dominated by the signal v of the near end telephone system. As the echo impulse response $\bar{h}$ more closely correlates to the actual echo response h, then $\bar{s}$ more closely approximates s and thus the magnitude of the echo signal component s on the signal e is more substantially reduced.

The echo impulse response model $\bar{h}$ may be replaced by an adaptive digital filter having an impulse response $\hat{h}$. Generally, the tap coefficients for such an adaptive response filter are found using a technique known as Normalized Least Mean Squares adaptation.

Although such an adaptive echo canceller architecture provides the echo canceller with the ability to readily adapt to changes in the echo path response h, it is highly susceptible to generating sub-optimal echo cancellation responses in the presence of "double talk" (a condition that occurs when both the speaker at the far end and the speaker at the near end are speaking concurrently as determined from the viewpoint of the echo canceller).

To reduce this sensitivity to double-talk conditions, it has been suggested to use both a non-adaptive response and an adaptive response filter in a single echo canceller. One such echo canceller is described in U.S. Pat. No. 3,787,645, issued to Ochiai et al on Jan. 22, 1974. Such an echo canceller is now commonly referred to as a dual-H echo canceller.

Another problem confronting echo canceller circuits is the possibility that the echo path response is non-linear. Such non-linear echo paths are often present in, for example, cellular telephone systems. The echo canceller must not only respond to the non-linear echo response to cancel the echo in an appropriate fashion, it must also be able to detect the presence of a non-linear response in the first place. The present inventors have recognized that the dual-H architecture may itself be employed to assist in detecting a non-linear echo path to thereby signal the echo canceller of the condition so that the echo canceller may respond in the appropriate manner.

BRIEF SUMMARY OF THE INVENTION

An echo canceller circuit for use in an echo canceller system is set forth that provides sensitive non-linear echo path response detection. The echo canceller circuit comprises a first digital filter having non-adaptive tap coefficients to simulate an echo response occurring during a call. A second digital filter having adaptive tap coefficients to simulate an echo response occurring during the call is also used. The adaptive tap coefficients of the second digital filter are updated over the duration of the call. A coefficient transfer controller is disposed in the echo canceller circuit to transfer the adaptive tap coefficients of the second digital filter to replace the tap coefficients of the first digital filter when a set of one or more transfer conditions is met. A non-linear echo path response detector is provided. The non-linear echo path detector is responsive to one or more parameters of the first and second digital filters to detect a non-linear echo path condition.

In accordance with one embodiment of the present invention, the non-linear echo path detector is responsive to a transfer density value corresponding to a number of transfers executed over a known period of time by the coefficient transfer controller. In accordance with a further embodiment of the present invention, the non-linear echo path detector is responsive to a coefficient time dispersion characteristic of the second digital filter for detecting a non-linear echo path condition.

DETAILED DESCRIPTION OF THE INVENTION

Figure 2:
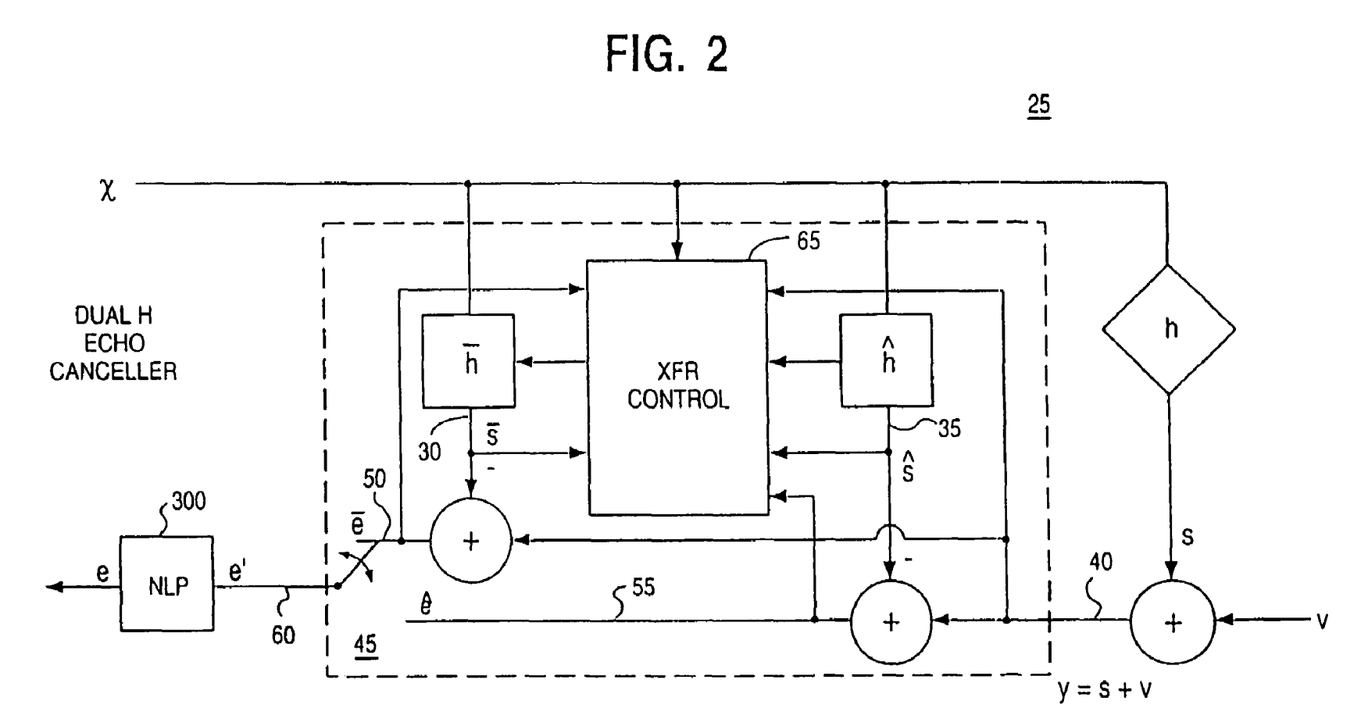
FIG. 2 is a schematic block diagram of an echo canceller that operates in accordance with one embodiment of the present invention.

FIG. 2 illustrates one embodiment of a dual-h echo canceller suitable for use in implementing the present invention. As illustrated, the echo canceller, shown generally at 25, includes both a non-adaptive filter $\overline{h}$ and an adaptive filter $\hat{h}$ to model the echo response h Each of the filters $\overline{h}$ and $\hat{h}$ are preferably implemented as digital filters, such as finite impulse response (FIR) filters comprising a plurality of taps each having a corresponding tap coefficient. This concept may be extended to IIR filters as well. If FIR filters are used, the duration of each of the FIR filters should be sufficient to cover the duration of the echo response of the channel in which the echo canceller 25 is disposed.

The output of the non-adaptive filter $\overline{h}$ is available at the line 30 while the output of the adaptive filter $\hat{h}$ is available at line 35. Each of the signals at lines 30 and 35 are subtracted from the signal-plus-echo signal of line 40 to generate echo compensated signals at lines 50 and 55, respectively. A switch 45, preferably a software switch, may be used to selectively provide either the output signal at the line 50 or the output signal at line 55 to the echo canceller output at line 60. The switch 45 may be used to provide the echo compensation based on the $\hat{h}$ filter during convergence and then be switched to provide the echo compensation based on the $\overline{h}$ filter after convergence. Further, the switch 45 is directed to provide the echo compensation based on the $\overline{h}$ filter in response to the detection of a double-talk condition.

A transfer controller 65 is used to transfer the tap coefficients of filter $\hat{h}$ to replace the tap coefficients of filter $\overline{h}$. As illustrated, the transfer controller 65 is connected to receive a number of system input signals. Of particular import with respect to the present invention, the transfer controller 65 receives the signal-plus-echo response y and each of the echo canceller signals $\overline{e}$ and $\hat{e}$ at lines 50 and 55, respectively. The transfer controller 65 is preferably implemented in the software of one or more digital signal processors used to implement the echo canceller 25.

As noted above, the art is substantially deficient of teachings with respect to the manner in which and conditions under which a transfer of tap coefficients from $\hat{h}$ to $\overline{h}$ is to occur. The present inventors have implemented a new process and, as such, a new echo canceller in which tap coefficient transfers are only made by the transfer controller 65 when selected criterion are met. The resulting echo canceller 25 has substantial advantages with respect to reduced double-talk sensitivity and increased double-talk detection capability. Further, it ensures a monotonic improvement in the estimates $\overline{h}$.

The foregoing system uses a parameter known as echo-return-loss-enhancement (ERLE) to measure and keep track of system performance. Two ERLE parameter values are used in the determination as to whether the transfer controller 65 transfers the tap coefficients from ħ to h̄. The first parameter, Ē, is defined in the following manner:

$$\bar{E} = \frac{y}{\bar{e}}$$

Similarly, the parameter Ê is defined as follows:

$$\hat{E} = \frac{y}{\hat{e}}$$

Each of the values Ê and Ē may also be averaged over a predetermined number of samples to arrive at averaged Ê and Ē values used in the system for the transfer determinations.

Figure 3:
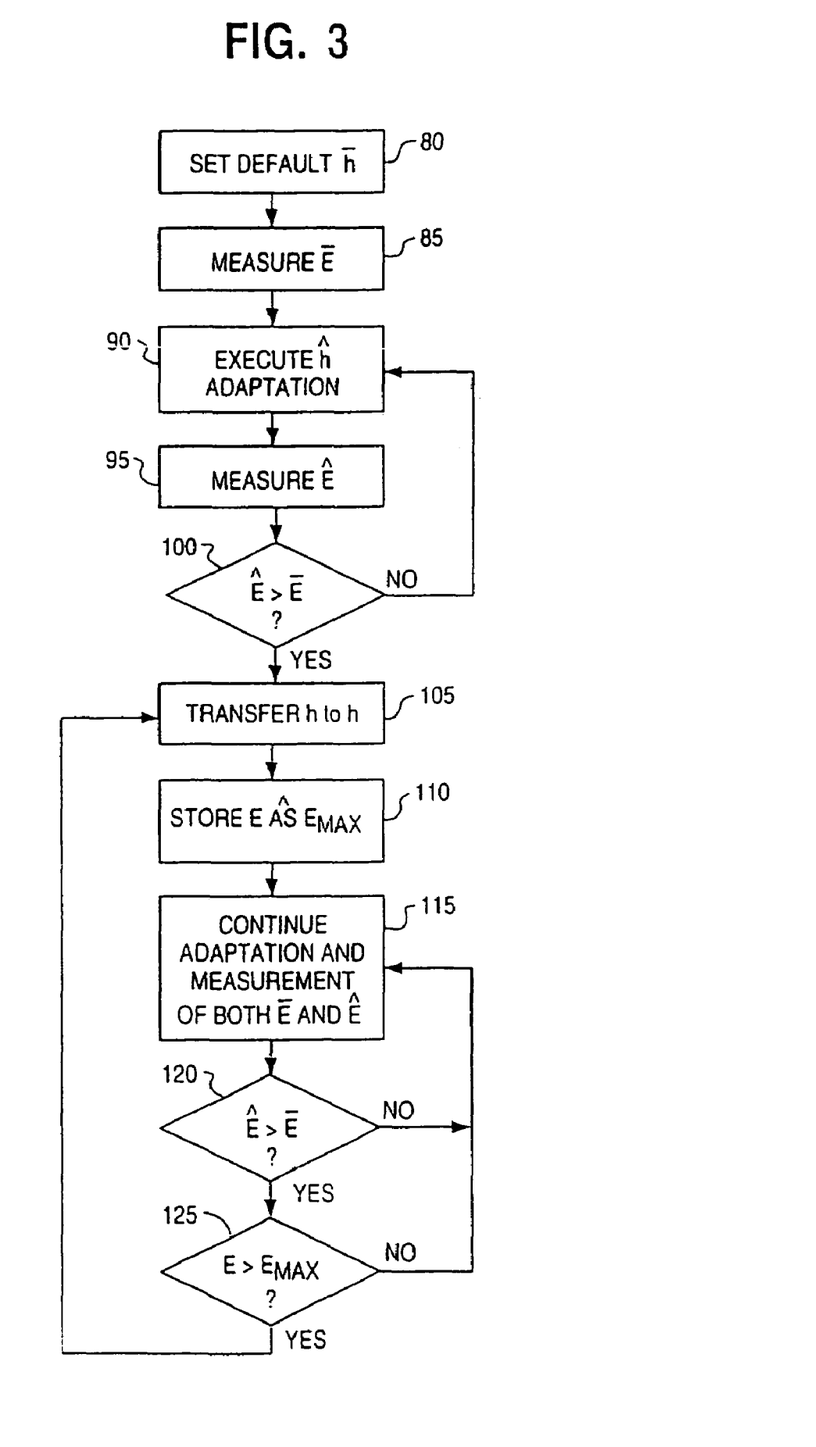
FIG. 3 is a flow chart illustrating one manner of carrying out coefficient transfers in accordance with one embodiment of the present invention.

FIG. 3 illustrates one manner of implementing the echo canceller 25 using the parameters Ê and Ē to control tap coefficients transfers between filter ħ to h̄. As illustrated, the echo canceller 25 provides a default h̄ set of coefficients at step 80 during the initial portions of the call. After the tap coefficients values for h̄ have been set, a measure of Ē is made at step 85 to measure the performance of the tap coefficient values of filter h̄.

After the initialization sequence of steps 80 and 85, or concurrent therewith, the echo canceller 25 begins and continues to adapt the coefficients of ħ to more adequately match the echo response h of the overall system. As noted in FIG. 3, this operation occurs at step 90. Preferably, the adaptation is made using a Normalized Least Mean Squares method, although other adaptive methods may also be used (e.g., LMS and RLS).

After a period of time has elapsed, preferably, a predetermined minimum period of time, the echo canceller 25 makes a measure of Ê at step 95. Preferably, this measurement is an averaged measurement. At step 100, the echo canceller 25 compares the value of Ê with the value of Ē. If the value of Ê is greater than the value of Ē, the tap coefficients of filter ħ are transferred to replace the tap coefficients of filter h̄ at step 105. If this criterion is not met, however, the echo canceller 25 will continue to adapt the coefficients of the adaptive filter ħ at step 90, periodically measure the value of Ê at step 95, and make the comparison of step 100 until the condition is met.

Although not illustrated, other transfer conditions may be imposed in addition to the foregoing. For example, the echo canceller may impose a requirement that a far end signal exist before a transfer may occur. Additionally, transfers may be inhibited during a double-talk condition. Further conditions may also be imposed based on system requirements.

If the echo canceller 25 finds that Ê is greater than Ē, the above-noted transfer takes place. Additionally, the echo canceller 25 stores the value of Ê as a value $E_{max}$. This operation is depicted at step 110 of the FIG. 3. The value of $E_{max}$ is thus the maximum value of ERLE that occurs over the duration of the call and at which a transfer has taken place. This further value is used thereafter, in addition to the Ê and Ē comparison, to control whether the tap coefficients of ħ are transferred by the transfer controller 65 to replace the tap coefficients of h̄. This further process is illustrated that steps 115, 120, and 125 of FIG. 3. In each instance, the tap coefficient transfer only occurs when both of the following two conditions are met: 1) Ê is greater than the current Ē, and 2) Ê is greater than any previous value of Ē used during the course of the call. (Ê is greater than $E_{max}$). Each time that both criteria are met, the transfer controller 65 of echo canceller 25 executes the tap coefficient transfer and replaces the previous $E_{max}$ value with the current Ê value for future comparison.

Requiring that Ê be greater than any Ē value used over the course of the call before the coefficient transfer takes place has two beneficial and desirable effects. First, each transfer is likely to replace the prior tap coefficients of filter h̄ with a better estimate of the echo path response. Second, this transfer requirement increases the double-talk protection of the echo canceller system. Although it is possible to have positive ERLE Ê during double-talk, the probability that Ê is greater than $E_{max}$ during double-talk decreases as the value of $E_{max}$ increases. Thus an undesirable coefficient transfer during double-talk becomes increasingly unlikely as the value of $E_{max}$ increases throughout the duration of the call.

The echo canceller 25 may impose both an upper boundary and a lower boundary on the value of $E_{max}$. For example, $E_{max}$ may have a lower bounded value of 6 dB and an upper bounded value of 24 dB. The purpose of the lower bound is to prevent normal transfers during double-talk conditions. It has been shown in simulations using speech inputs that during double-talk, a value of greater than 6 dB ERLE was a very low probability event, thus making it an appropriate value for the initial value of $E_{max}$. The upper bound on $E_{max}$ is used to prevent a spuriously high measurement from setting $E_{max}$ to a value at which further transfers become impossible.

The value of $E_{max}$ should be set to, for example, the lower bound value at the beginning of each call. Failure to do so will prevent tap coefficient transfers on a new call until the echo cancellation response of the echo canceller 25 on the new call surpasses the quality of the response existing at the end of the prior call. However, this criterion may never be met during the subsequent call Thereby causing the echo canceller 25 to operate using sub-optimal tap coefficients values. Resetting the $E_{max}$ value to a lower value increases the likelihood that a tap coefficient transfer will take place and, thereby, assists in ensuring that the h̄ filter uses tap coefficients for echo cancellation that more closely correspond to the echo path response of the new call.

Figure 4:
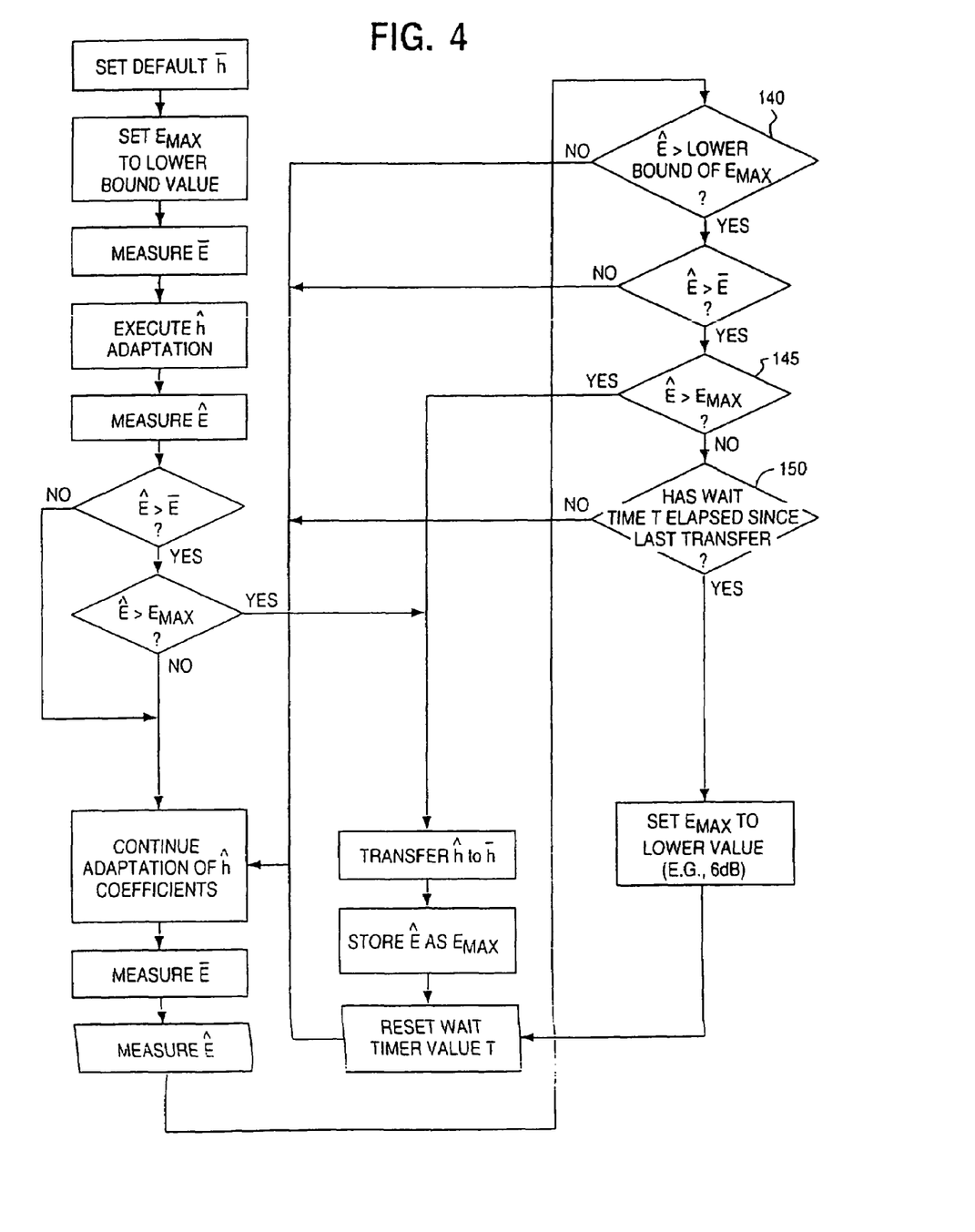
FIG. 4 is a flow chart illustrating a further manner of carrying out coefficient transfers in accordance with a further embodiment of the present invention.

One manner of implementing the $E_{max}$ value change is illustrated in the echo canceller operations flow-chart of FIG. 4. When all transfer conditions are met except Ê greater than $E_{max}$, and this condition persists for a predetermined duration of time, the echo canceller 25 will reset the $E_{max}$ value to, for example, the lower bound value. In the exemplary operations shown in FIG. 4, the echo canceller 25 determines whether Ê is greater than the lower bound of $E_{max}$ at step 140 and less than the current value of $E_{max}$ at step 145. If both of these condition remain true for a predetermined period of time as determined at step 150, and all other transfer criterion have been met, the echo canceller 25 resets the $E_{max}$ value to a lower value, for example, the lower bound of the $E_{max}$ value, at step 155. This lowering of the $E_{max}$ value increases the likelihood of a subsequent tap coefficient transfer.

Choosing values for the lower and upper bound of $E_{max}$ other than 6 dB and 24 dB, respectively, is also possible in the present system. Choosing a lower bound of $E_{max}$ smaller than 6 dB provides for a relatively prompt tap coefficient transfer after a reset operation or a new call, but sacrifices some double-talk protection. A value greater than 6 dB, however, inhibits tap coefficient transfer for a longer period of time, but increases the double-talk immunity of the echo canceller. Similarly, varying the value of the predetermined wait time T before which $E_{max}$ is reset may also be used to adjust echo canceller performance. A shorter predetermined wait time T produces faster reconvergence transfers, but may sacrifice some double-talk immunity. The opposite is true for larger predetermined wait time values.

A further modification of the foregoing echo canceller system relates to the value stored as $E_{max}$ at the instant of tap coefficient transfer. Instead of setting $E_{max}$ equal to the $\hat{E}$ value at the transfer instant, $E_{max}$ may be set to a value equal to the value of $\hat{E}$ minus a constant value (e.g., one, three; or 6 dB). At no time, however, should the $E_{max}$ value be set to a value that is below the lower bound value for $E_{max}$. Additionally, a further condition may be imposed in that a new softened $E_{max}$ is not less than the prior value of $E_{max}$. The foregoing "softening" of the $E_{max}$ value increases the number of transfers that occur and, further, provides more decision-making weight to the condition of $\hat{E}$ being larger than $\overline{E}$.

As will be readily recognized, the echo canceller of the present invention may be implemented in a wide range of manners. Preferably, the echo canceller system is implemented using one or more digital signal processors to carry out the filter and transfer operations. Digital-to-analog conversions of various signals are carried out in accordance with known techniques for use by the digital signal processors.

There are some circumstances when the foregoing transfer criterion should be defeated. For example, the transfer criterion is preferably defeated when 1) the long-term ERLE remains low, and 2) a small but measurable performance advantage of ĥ over h̄ is sustained over a long period of time.

One case in which it should be defeated is when the steady-state ERLE remains below the lower value of $E_{max}$. Such a case may occur when there is a high-level, constant background noise entering from the near-end which may lower the measured ERLE considerably. Since the foregoing process prevents transfers from occurring unless the ERLE is greater than the lower bound of $E_{max}$, no transfers are possible in low ERLE situations. Since the h̄ may contain the solution to a previous call at the start of a new, low ERLE call, defeating the foregoing transfer criterion is preferable in some cases.

The first condition for defeating the foregoing transfer criterion is a sustained low ERLE measurement over a relatively long period of time (e.g. 150 to 500 msec) of adaptation. Since a low ERLE call will tend to have a smaller difference between the ERLEs of h̄ and ĥ (a 1 dB difference may be the largest difference observed), the required ERLE difference between ĥ and h̄ for a transfer to occur should be reduced (e.g. to 0 or 1 dB) once the long-term ERLE is confirmed to be low. To compensate, a requirement may be imposed whereby the small ERLE difference between h̄ and ĥ is maintained for a long period of time (e.g. 75 to 200 msec) before the transfer is allowed.

Each of the filters ĥ and h̄ preferably include one or more D.C. taps to compensate for non-linearities in the echo path response. The result is that the filters can model a D.C. shift quite accurately, and high ERLE can be achieved despite the presence of a D.C. non-linearity.

More complex non-linearities in the echo path response generally require more complex non-linear processing. One manner in which the echo canceller 25 can process such non-linearities is set forth in U.S. Ser. No. 08/970,634, titled Minature Galvanic Cell Having Optimum Internal Volume for the Active Components, the teachings of which are hereby incorporated by reference. A further manner in which the echo canceller may compensate for non-linearites is by directing switch 45 to use the ĥ filter to cancel the echo. This is due to the fact that the ĥ filter is more time responsive to the non-linearities since the NLMS adaptation process attempts to find the best short term solutions for the non-linearities in the echo path so as to maximize ERLE even where the short term solutions diverge from the long-term linear response.

The present inventors have recognized that a difference in the number of coefficient transfers from ĥ to h̄ occurs depending on whether or not the echo path has a non-linear component. When the echo path has an entirely linear response, the tap coefficients of ĥ generally reflect the linear impulse response of the echo path. In a non-linear echo path having a non-linear residual echo signal, the residual echo will tend to increase when compared to the linear response. In an attempt to reduce this residual echo, the tap coefficients of ĥ move, for short periods of time, away from the linear impulse response to maximize the short-term ERLE. This occurs since the tap coefficients are adapted using a Least Mean Squares adaptation process which constantly tries to minimize the short term ERLE. As the non-linearity of the echo signal increases, the effect of the tap coefficients moving away from their original linear position to gain short term improvements becomes more pronounced.

For linear echo paths, the operational logic of the echo canceller 25 assumes that a number of transfers will occur at the beginning of the call as the echo canceller 25 adjusts the taps to the model echo path response and transfers that model to the h̄ filter. After the initial convergence period, the expected number of transfers per unit time will become small if the echo path is truly non-linear. Conversely, the best cancellation solution varies with time for non-linear calls when using a linear echo canceller. As a result, the non-adaptive taps of the h̄ filter quickly become sub-optimal when compared to the $\hat{E}$ value of the ĥ filter response. For example, the h̄ coefficients may become sub-optimal as compared to ĥ within about 50 milliseconds. As a result, the transfer density, i.e. the number of transfers per unit time, becomes large and continues to stay large throughout the entire call.

With foregoing in mind, the echo canceller 25 measures the transfer density after a convergence period to determine whether the echo path response is linear or non-linear. To this end, the echo canceller 25 is programmed to store a transfer density threshold value TDT. The echo canceller 25 maintains a count of the number of transfers TC that occur over a period of time. This count is compared to the transfer density threshold value TDT. If this count TC, and thus the transfer density, exceeds the transfer density threshold value TDT, the echo canceller 25 declares the presence of a non-linear echo path response and executes the appropriate operations needed to cancel the echo signal. If the count TC, and thus the transfer density, is below the threshold value TDT, the echo canceller 25 handles the echo cancellation as a linear echo cancellation.

The value of TC may be calculated in a number of different manners. It may be calculated using a software counter that is read on a predetermined periodic basis at intervals T and that it is reset immediately after being read. The resulting count may be directly used and compared to the transfer density threshold value TDT. In such instances, the value of the transfer density threshold value TDT is selected based on the period used to read the software counter.

In a more complicated process for determining the value of TC, the time at which a software counter is read and the corresponding counter value are stored and memory. During a subsequent reading of the counter value, both the counter value and the time at which the counter is subsequently read are noted. The value of TC may then be calculated as the difference between the initial and final counter values divided by the difference between the initial and final time values.

The value of TC may also correspond to an averaged transfer density value. In such instances, the value TC may be calculated using a digital filter which calculates a moving average of the number of transfers per unit time. Such a filter preferable has, for example, a slow attack time constant and fast decay time constant, although this is not mandatory. A value of 1 is supplied to the averaging filter each time a transfer takes place during a frame having a predetermined period. A value of 0 is supplied to the averaging filter each time a transfer does not take place during the frame. When the output of the averaging filter exceeds the threshold value TDV, a non-linear condition is declared.

Figure 5A:
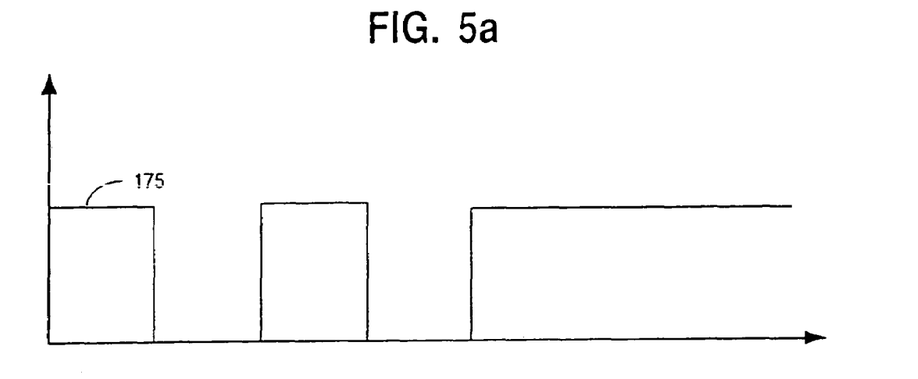
FIG. 5 illustrates the input and output of a filter that may be used to assist in measuring transfer density.
Figure 5B:
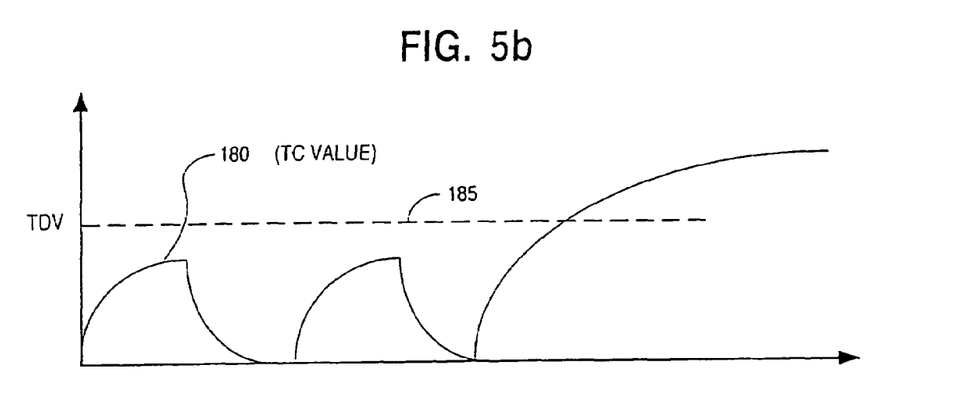

Such a situation is illustrated in FIG. 5. As shown, a value of 1 is applied to the filter input during each frame in which a transfer has taken place. A value of 0 is provided to the filter input if no transfer has taken place during the frame. The input value is illustrated at line 175 while the output value is illustrated at line 180. When this output value exceeds the threshold value TDV, designated at line 185, a non-linear condition is declared. The foregoing filter configuration may be implemented in hardware. However, it is preferably implemented in the software of one or more digital signal processors used to implement the echo canceller 25.

Figure 6:
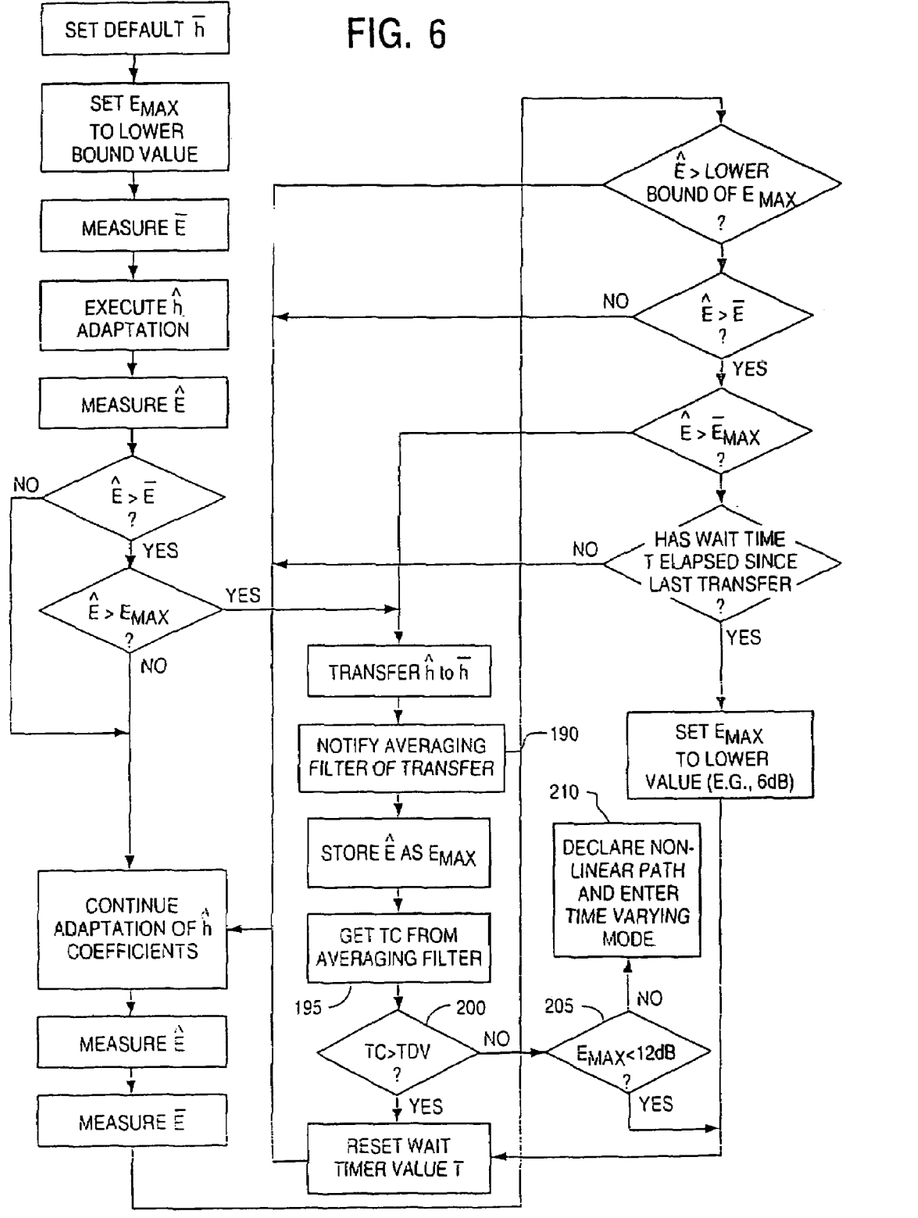
FIG. 6 illustrates one manner of implementing non-linear echo path detection in the echo canceller operations previously described in connection with FIG. 4.

One manner of incorporating the foregoing threshold detection process in the operations of the process of FIG. 4 is illustrated in FIG. 6. As illustrated, the averaging filter is notified at step 190 that a transfer has taken place. The resulting filtered value is retrieved at step 195 and compared to the threshold value at step 200. If the threshold value TDV is exceeded, the Emax value is checked at step 205 to ensure that it is above a threshold value (e.g., 12 dB) before a non-linear echo path condition is declared. If Emax is below this value, no such declaration is made. This check to ensure that the Emax value is greater than a predetermined value assists in ensuring that a non-linear echo path condition is not declared during periods of convergence and reconvergence of the adaptive filter. If Emax is above this value, a non-linear echo path response is declared at step 210.

A further manner for detecting non-linearities using one or more characteristics of the filter ĥ is illustrated in connection with FIGS. 7 and 8. In accordance with this further manner, the time dispersion of the tap coefficient values is used to determine whether the echo path is linear or non-linear.

Figure 7:
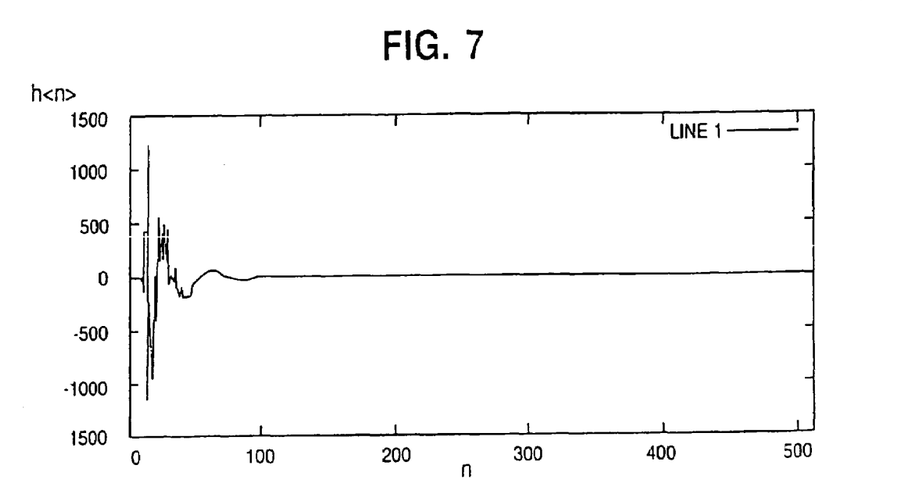
FIG. 7 illustrates tap coefficient time dispersion for the adaptive filter when responding to a linear echo path.

A graph of the tap coefficients of the ĥ filter with respect to the time delay associated with each tap is illustrated in FIG. 7 for a linear echo path response. As shown, the ĥ response is comprised of a small number of large magnitude taps (shown here as those taps numbered 0 to 100) and many taps that are near 0 (shown here as taps numbered 101 to 511). Other linear echo paths generally yield similar results wherein a small percentage of the total number of taps are used to model the echo response and a large number of taps have coefficients that are approximately equal to 0. As such, the ĥ coefficients have a generally small time dispersion value (i.e., the majority of the energy of the ĥ coefficients is confined to a small window of time).

Figure 8:
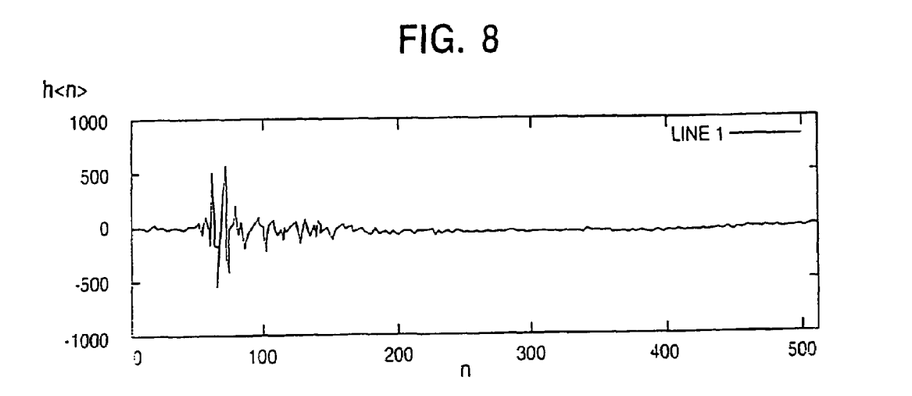
FIG. 8 illustrates tap coefficient time dispersion for the adaptive filter when responding to a non-linear echo path.

FIG. 8 illustrates the coefficient values of ĥ when attempting to model the echo response of a non-linear echo path. In this case, the ratio of the number of taps having large tap coefficients to the number of taps having low value tap coefficients is not as large as it was in the linear case of FIG. 7. The energy of the taps of ĥ is more widely dispersed among the taps. The relatively lower value tap coefficients are much larger in the non-linear case since they are playing an active role in finding short-term solutions for canceling the non-linear components of the echo. As such, the ĥ coefficients have a generally large time dispersion value when attempting to model a non-linear echo path (i.e., the tap energy is dispersed over a large number of taps.)

In view of the foregoing characteristics recognized by the present inventors, the echo canceller 25 calculates the time dispersion of the tap coefficients of the ĥ filter to determine whether the echo path is linear or non-linear. The time dispersion value is compared to a threshold. The threshold depends on the method of measuring the time dispersion and can be chosen experimentally. When the time dispersion value moves above the threshold, a non-linear echo path is declared. Otherwise, the echo path is assumed to be linear. Hysteresis can be used in making this determination.

The time dispersion value can be calculated in many ways. In accordance with one manner, the echo canceller may find the inverse of the fraction of the total tap energy which can be attributed to the largest M taps, where M is a small number compared to the total number of taps in the ĥ filter. In accordance with a further manner of calculating time dispersion, the echo canceller may measure the ratio of the L lowest tap coefficients to the number M of the largest tap coefficients. However it is measured, the time dispersion will be larger for non-linear calls than for linear calls.

The time dispersion process of the echo canceller 25 car be augmented with a few other processes to improve its accuracy. For example, the echo canceller 25 may require that the time dispersion value remain above the threshold for a predetermined period of time before a non-linear echo path is declared. Such a requirement assists in preventing a period of convergence and reconvergence, which also might be characterized with large time dispersion values, from falsely tripping the non-linear detector process. Still further, the echo canceller may require that a measurement of the background noise be made prior to declaring a non-linear echo path. High levels of background noise may increase the time dispersion thereby causing a false indication of non-linearity. The echo canceller 25 may be programmed to require both a low background noise condition and a high time dispersion value above the threshold before declaring the presence of a non-linear echo path.

Figure 9:
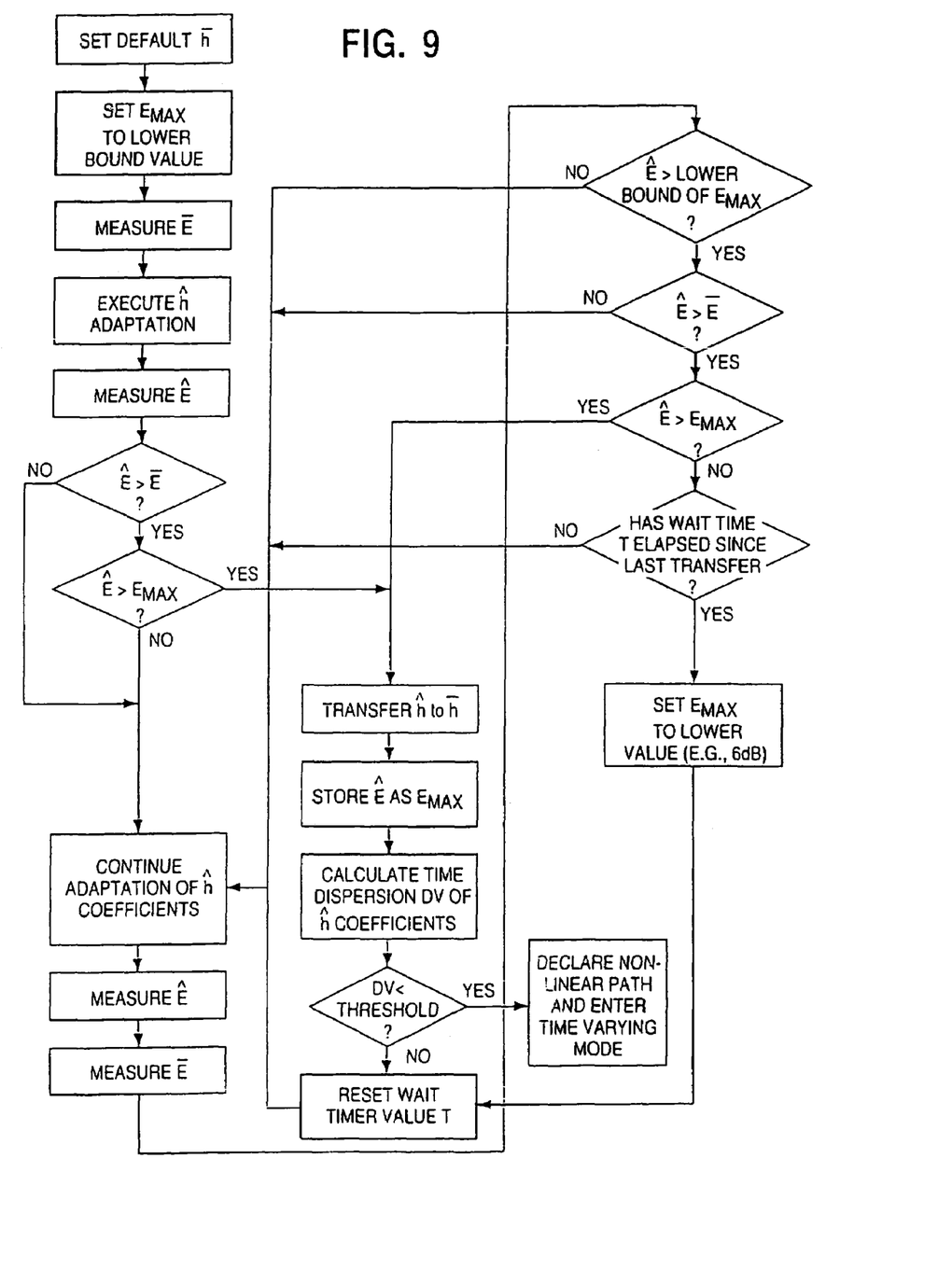
FIG. 9 illustrates one manner of implementing a non-linear detector using time dispersion as applied to the echo canceller operations of FIG. 4.

One manner of implementing the time dispersion process in the process shown in FIG. 4 is illustrated in FIG. 9.

When a non-linear echo path is detected, the echo canceller 25 preferably enters a time varying mode. In this mode, the output decision logic is biased to use the ĥ filter to compensate for the echo response. This may be accomplished, for example, by transferring switch 45 so that the ĥ output is consistently used for the echo compensation. Alternatively, this bias may be accomplished by varying the ĥ to h̄ transfer criterion discussed above so as to make the transfers more likely to occur. Additionally, the adaptation gain used to adapt the tap coefficients of ĥ is preferably lowered so as to reduce the rate at which the tap coefficients change and prevent overshoot of short term solutions. Further, any split adaptation of the tap coefficients is inhibited in time varying mode. Such split adaptation is shown and described in U.S. Ser. No. 08/970,229 titled "ECHO CANCELLER EMPLOYING DUAL-H ARCHITECTURE HAVING SPLIT ADAPTIVE GAINS SETTINGS", filed on even date herewith.

A further manner of detecting non-linearities based on the adapted coefficients is to monitor the variance of each of the taps over time. A large tap variance indicates non-linearities while a low tap variance indicates a linear echo path response.

Figure 10:
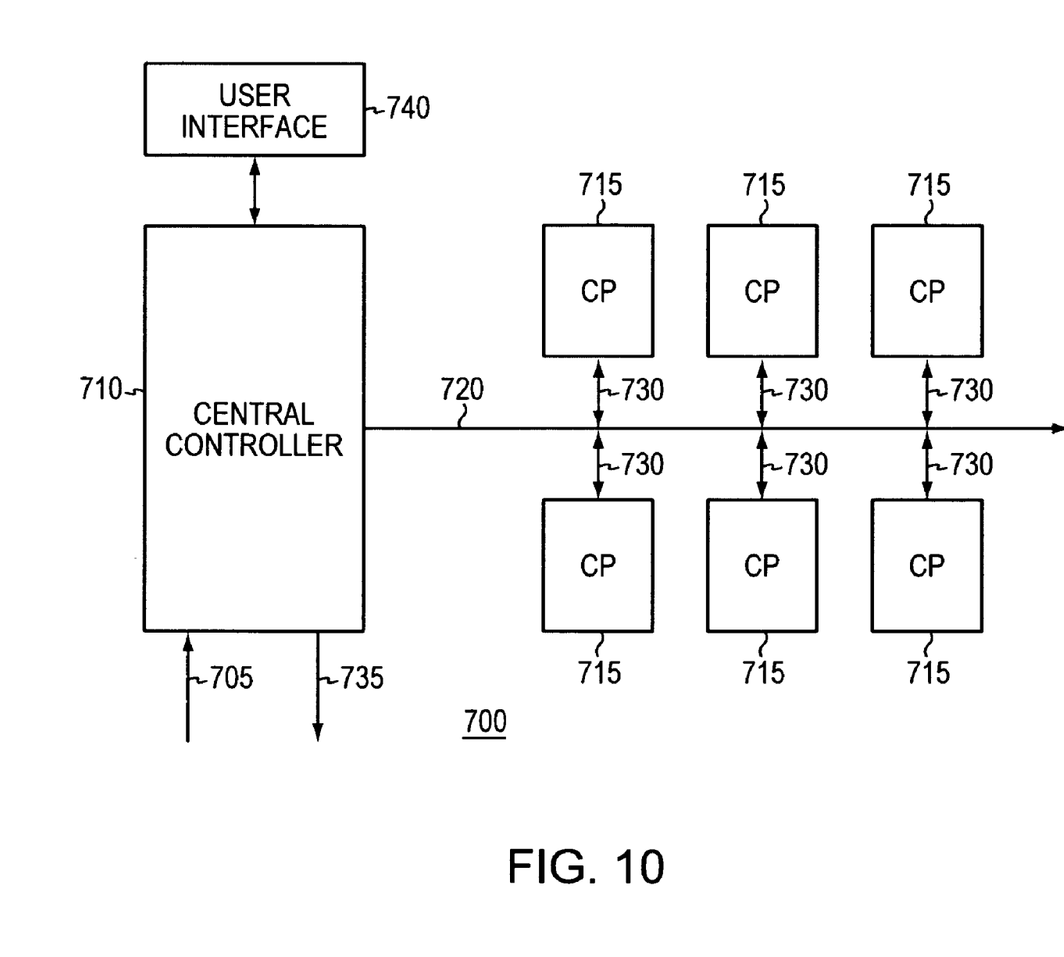
FIG. 10 illustrates one manner of implementing an echo canceller system employing the present invention.

FIG. 10 illustrates one embodiment of an echo canceller system, shown generally at 700, that maybe used to cancel echoes in multi-channel communication transmissions. As illustrated, the system 700 includes an input 705 that is connected to receive a multi-channel communications data, such as a T1 transmission. A central controller 710 deinterleaves the various channels of the transmission and provides them to respective convolution processors 715 over a data bus 720. It is within the convolution processors 715 that a majority of the foregoing operations take place. Each convolution processor 715 is designed to process at least one channel of the transmission at line 730. After each convolution processor 715 has processed its respective channel(s), the resulting data is placed on the data bus 720. The central controller 710 multiplexes the data into the proper multichannel format (e.g., T1) for retransmission at line 735. User interface 740 is provided to set various user programmable parameters of the system.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A method for compensating for echo response, comprising;
    detecting a non-linear echo path condition; and
    entering a time-varying mode in response to detecting the non-linear echo path condition.

2. The method of claim 1, wherein detecting the non-linear echo path condition includes detecting a coefficient time dispersion characteristic.

3. The method of claim 2, wherein the coefficient time dispersion characteristic indicates coefficient time dispersion above a predetermined threshold value.

4. The method of claim 3, wherein the coefficient time dispersion is above the predetermined threshold value for a predetermined period of time.

5. The method of claim 2, wherein the coefficient time dispersion characteristic indicates coefficient time dispersion above a predetermined threshold value and a background noise level below a predetermined value.

6. The method of claim 5, wherein the coefficient time dispersion is above the predetermined threshold value for a predetermined period of time.

7. The method of claim 1, wherein detecting the non-linear echo path condition includes detecting a transfer density value corresponding to a number of transfers of adaptive tap coefficients to a digital filter.

8. The method of claim 7, wherein the digital filter is a finite impulse response filter.

9. The method of claim 8, wherein the finite impulse response filter comprises a plurality of D.C. taps.

10. The method of claim 7, wherein the digital filter is an infinite impulse response filter.

11. The method of claim 1, wherein entering a time varying mode includes biasing an output decision logic to compensate for echo response.

12. The method of claim 11, wherein biasing the output decision is based on varying a transfer criterion used to transfer coefficients between adaptive and non-adaptive filters used to compensate for echo.

13. The method of claim 2, further including maintaining background noise level below a predetermined value to avoid a false indication of non-linearity.

14. An apparatus for compensating for echo response, the apparatus comprising:
    a detector to detect a non-linear echo path condition; and
    a unit responsive to the detector to cause an echo compensator to enter a time-varying mode in response to detecting the non-linear echo path condition.

15. The apparatus of claim 14, wherein the detector is configured to detect a coefficient time dispersion characteristic.

16. The apparatus of claim 15, wherein the coefficient time dispersion characteristic indicates coefficient time dispersion above a predetermined threshold value.

17. The apparatus of claim 16, wherein the coefficient time dispersion is above the predetermined threshold value for a predetermined period of time.

18. The apparatus of claim 15, wherein the coefficient time dispersion characteristic indicates coefficient time dispersion above a predetermined threshold value and a background noise level below a predetermined value.

19. The apparatus of claim 18, wherein the coefficient time dispersion is above the predetermined threshold value for a predetermined period of time.

20. The apparatus of claim 15,wherein entering a time varying mode includes outputting a decision logic biased to use the adaptive filter to compensate for echo response.

21. The apparatus of claim 15, wherein maintaining background noise level below a predetermined value to avoid a false indication of non-linearity.

22. The apparatus of claim 14, wherein the detector is further configured to detect a transfer density value corresponding to a number of transfers of adaptive tap coefficients to a digital filter.

23. The apparatus of claim 22, wherein digital filter is a finite impulse response filter.

24. The apparatus of claim 23, wherein the finite impulse response filter comprises a plurality of D.C. taps.

25. The apparatus of claim 22, wherein the digital filter is an infinite impulse response filter.

* * * * *